US012805546B2

(12) United States Patent
Feinberg et al.

(10) Patent No.: US 12,805,546 B2
(45) Date of Patent: Nov. 24, 2026

(54) MICROBIAL-BASED ANIMAL FEED FOR MODULATING OFF-FLAVOR CONTENT IN AQUACULTURE

(71) Applicant: KNIPBIO, INC., Lowell, MA (US)

(72) Inventors: Lawrence F. Feinberg, Lowell, MA (US); Daniel R. Smith, Lowell, MA (US); Devin H. Currie, Lowell, MA (US); Guillaume Salze, Lowell, MA (US); Bonnie D. McAvoy, Lowell, MA (US); Catherine J. Pujol-Baxley, Lowell, MA (US)

(73) Assignee: KNIPBIO, INC., Lowell, MA (US)

( * ) Notice: Subject to any disclaimer, the term of this patent is extended or adjusted under 35 U.S.C. 154(b) by 687 days.

(21) Appl. No.: 17/919,865

(22) PCT Filed: Apr. 18, 2021

(86) PCT No.: PCT/US2021/027855

§ 371 (c)(1),
(2) Date: Oct. 19, 2022

(87) PCT Pub. No.: WO2021/216387

PCT Pub. Date: Oct. 28, 2021

(65) Prior Publication Data

US 2023/0225366 A1 Jul. 20, 2023

Related U.S. Application Data

(60) Provisional application No. 63/104,480, filed on Oct. 22, 2020, provisional application No. 63/012,868, filed on Apr. 20, 2020.

(51) Int. Cl.
*A23K 10/16* (2016.01)
*A01K 61/85* (2017.01)
(Continued)

(52) U.S. Cl.
CPC .............. *A23K 10/16* (2016.05); *A01K 61/85* (2017.01); *A01K 63/04* (2013.01); *A23K 50/80* (2016.05);
(Continued)

(58) Field of Classification Search
CPC ................................ A23K 10/16; A23K 50/80
See application file for complete search history.

(56) References Cited

U.S. PATENT DOCUMENTS 6,444,433 B1 9/2002 Plhak et al.
6,447,681 B1 9/2002 Calberg et al.
(Continued)

FOREIGN PATENT DOCUMENTS

CN 104304830 A 1/2015
WO 2005115176 A1 12/2005
(Continued)

OTHER PUBLICATIONS

Machine translation of CN 104304830 to Lei et al. Publication date Jan. 28, 2015. pp. 1-25. (Year: 2015).*
(Continued)

*Primary Examiner* — Jenna A Watts
(74) *Attorney, Agent, or Firm* — Benesch Friedlander Coplan & Aronoff LLP; Alisha A. Contractor

(57) ABSTRACT

Methods and compositions are provided for reducing off-flavor in aquatic species or in aqueous systems. Microbial biomass or its derivatives is provided in the form of a feed composition or into the water in an aquaculture production system or other aqueous system, thereby modulating the level of one or more off-flavor producing compounds.

10 Claims, 2 Drawing Sheets

(51) Int. Cl.

| | |
|---|---|
| ***A01K 63/04*** | (2006.01) |
| ***A23K 50/80*** | (2016.01) |
| ***A23L 17/00*** | (2016.01) |
| ***C02F 3/34*** | (2023.01) |
| *C02F 101/34* | (2006.01) |
| *C02F 103/00* | (2006.01) |
| *C02F 103/20* | (2006.01) |

(52) U.S. Cl.
CPC ................ *A23L 17/00* (2016.08); *C02F 3/34* (2013.01); *C02F 2101/34* (2013.01); *C02F 2103/007* (2013.01); *C02F 2103/20* (2013.01)

(56) References Cited

U.S. PATENT DOCUMENTS

| | | | |
|---|---|---|---|
| 6,482,635 | B2 | 11/2002 | Walker et al. |
| 6,902,675 | B2 | 6/2005 | Kelly et al. |
| 8,535,883 | B2 | 9/2013 | Cane et al. |
| 9,193,615 | B2 | 11/2015 | Michaels et al. |
| 9,592,298 | B2 | 3/2017 | Lin et al. |
| 2006/0286205 | A1 | 12/2006 | Fichtali et al. |
| 2011/0045128 | A1 | 2/2011 | Damodaran et al. |
| 2013/0292335 | A1 | 11/2013 | Lahav et al. |
| 2014/0221208 | A1 | 8/2014 | Hargrove et al. |
| 2015/0044327 | A1 | 2/2015 | Feinberg et al. |

FOREIGN PATENT DOCUMENTS

| | | | |
|---|---|---|---|
| WO | 2015021352 | A2 | 2/2015 |
| WO | 2017153986 | A1 | 9/2017 |
| WO | 2018106549 | A1 | 6/2018 |
| WO | WO2018195296 | A1 | 10/2018 |
| WO | 2018222946 | A1 | 12/2018 |

OTHER PUBLICATIONS

Tucker, et al. “Managing off-flavor problems in pond-raised catfish”. Available online as of Aug. 1999. SRAC Publication No. 192. pp. 1-8. (Year: 1999).*

Dequito et al, “Biodegradation of 2-MIB and geosmin by bacteria isolated from aquaculture pond water and sediment.” Available online as of 2015, Elba Bioflux, vol. 7, Issue 2. pp. 1-8. (Year: 2015).*

Sarlin and Philip, “Marine yeasts as feed supplement for Indian white prawn : Screening and Testing”. Available online as of 2016 from Int. J. Curr. Microbiol. App. Sci., 5 (1), 55-70. (Year: 2016).*

Hirano et al., Identification of Volatile Compounds in Ayu Fish and Its Feeds, Nippon Suisan Gakkaishi, 58 (3), 547-557, 1992.

Aramaki et al., Evidence for Autoregulation of camR, Which Encodes a Repressor for the Cytochrome P-450cam Hydroxylase Operon on the Pseudomonas Putids CAM Plasmid, Journal of Bateriology, Dec. 1993, p. 7828-7833, vol. 175, No. 24.

Tsang et al, Borneol Dehydrogenase from *Pseudomonas* sp. Strain TCU-HL1 Catalyzes the Oxidation of ()-Borneol and Its Isomers to Camphor, American Society for Microbiology, Applied and Environmental Microbiology, Nov. 2016, vol. 82, No. 21, pp. 6378-6385.

Izaguirre et al., Degradation of 2-Methylisoborneol by Aquatic Bacteria, Applied and Environmental Microbiology, Oct. 1988, p. 2424-2431, vol. 54, No. 10.

Eaton et al., Biotransformations of 2-Methylisoborneol by Camphor-Degrading Bacteria, Applied and Environmental Microbiology, Feb. 2009, p. 583-588, vol. 75, No. 3.

Guttman et al., Isolation of Bacteria Capable of Growth with 2-Methylisoborneol and Geosmin as the Sole Carbon and Energy Sources, Applied and Environmental Microbiology, p. 363-370, Jan. 2012, vol. 78, No. 2.

Azaria et al., Combined Adsorption and Degradation of the off-flavor compound 2-methylisoborneol in sludge derived from a recirculating aquaculture system, Chemosphere 169 (2017) pp. 69-77.

Eaton et al., Dehydration of the off-flavor chemical 2-methylisoborneol by the R-limonene-degrading bacteria *Pseudomonas* sp. strain 19-rlim and *Sphingomonas* sp. strain BIR2-rlima, Biodegration, 2012, 23: 253-261.

Dequito et al., Biodegradation of 2-methylisoborneol (2-MIB) and geosmin by bacteria isolated from aquaculture pond water and sediment, ELBA BIoFLUX, 2015, vol. 7, Issue 2.

Suurnakki et al., Identification of geosmin and 2-methylisoborneol in cyanobacteria and molecular detection methods for the producers of these compounds, Water Research 68 (2015) 56-66.

Ma et al., Odor-Active volatile compounds profile of triploid rainbow trout with different marketable sizes, Elsevier, Aquaculture Reports 17, 2020, 100312.

Frank et al., Investigation of Sensory and Volatile Characteristics of Farmed and Wild Barramundi (*Lates calcarifer*) using Gas Chromatography—Olfactometry Mass Spectrometry and Descriptive Sensory Analysis, J. Argic. Food Chem 2009, 57, 10302-10312.

Ganeko et al., Analysis of Volatile Flavor Compounds of Sardine (*Sardinops melanostica*) by Solid Phase Microextration, Institute of Food Technologies, vol. 73, Nr. 1, 2008, Journal of Food Science, S83-S88.

Lee et al., Analysis of Headspace Volatile and Oxidized Volatile Compounds in DHA-enriched Fish Oil on Accelerated Oxidative Storage, vol. 68, Nr. 7, 2003—Journal of Food Science, 2169-2177.

Johnsen et la., Influence of Fat Content on Uptake and Depuration of the Off-Flavor 2-Methylisoborneol by Channel Catfish (*Ictalurus puynctatus*), Can, J, Fish. Aquat. Sci. vol. 49, 1992, 2406-2411.

Leduc et al., Differentiation of fresh and frozen/thawed fish, European sea bass (*Dicentrarchus labrax*), gilthead seabream (*Sparus aurata*), cod (*Gadus morhua*) and salmon (*Salmo salar*), using volatile compounds by SPME/GC/MS, J Sci Food Agric 2012, 92-2560-2568.

Mahmoud et al., Characterisation of aroma-active and off-odour compounds in German rainbow trout (*Oncorhynchus mykiss*). Part II: Case of fish meat and skin from earthen-ponds farming, Food Chemistry, 232 (2017) 841-849.

Peng et al., Determination of Seven Odorants in Purified Water Among Worldwide Brands by HS-SPME Coupled to GC-MS., Chromatographia (2014) 77: 729-735.

Selli et al., Odour-active and off-odour components in rainbow trout (*Oncorhynchus mykiss*) extracts obtained by microwave assisted distillation-solvent extraction, Food Chemistry 114 (2009) 317-322.

Iglesias et al., Solid-phase microextraction method for the determination of volatile compounds associated to oxidation of fish muscle, Journal of Chromatography, (2008): 9-16.

Yasuhara, Odorus Volatile Components in Ayus Fish, Article in Toxicological and Environmental Chemistry—Feb. 1995, 197-201.

Hisieh et al., Lipoxygenase generation of specific volatile flavor carbonyl compounds in fish tissues., Journal of Agricultural and Food Chemistry 37.2 (1989): 279-286.

Woraprayote, Suppression of white feces syndrome in Pacific white shrimp, *Litopenaeus vannamei*, using hen egg white lysozyme, Aquaculture 521, 2020, 735025, p. 1-8.

Harsij et al., Effects of antioxidant supplementation (nano-selenium, vitamin C and E) on growth performance, blood biochemistry, immune status and body composition of rainbow trout (*Oncorhynchus mykiss*) under sub-lethal ammonia exposure, Aquaculture 521, 2020, 734942, pp. 1-6.

Fisher et al., Black solder fly larvae meal as a protein source in low fish meal diets for Atlantic salmon (*Salmo salar*), Aquaculture 521, 2020, 734978, pp. 1-9.

Valenzuela-Muñoz et la., Induced-iron overdose modulate the immune response in Atlantic salmon increasing the susceptibility to Piscirickettsia salmonis infection, Aquaculture 521, 2020, 735058, pp. 1-14.

Kiataramgul et al., An oral delivery system for controlling white spot syndrome virus infection in shrimp using transgenic microalgae, Aquaculture 521, 2020, 735022, pp. 1-8.

Chang et al., Biocontrol of acute hepatopancreatic necrosis disease (AHPND) in shrimp using a microalgal-bacterial consortium, Aquaculture 521, 2020, 734990, pp. 1-8.

Grünenwald et al., Heterogeneous astaxanthin distribution in the fillet of Atlantic salmon post-smolt at elevated temperature is not

(56) References Cited

OTHER PUBLICATIONS affected by dietary fatty acid composition, metabolic conversion of astaxanthin to idoxanthin, or oxidative stress, Aquaculture 521, 2020, 735096, pp. 1-13.
Torun et al., Nitrate amendment to control sulphide accumulation in shrimp ponds, Aquaculture 521, 2020, 735010 pp. 1-9.
Basto et al., Nutritional value of different insect larvae meals as protein sources for European sea bass (*Dicentrarchus abrax*) juveniles, Aquaculture 521, 2020, 735010 pp. 1-10.
Lee et al., Apparent digestibility of protein, amino acids and gross energy in rainbow trout fed various feed igredients with or without protease, Aquaculture 2019, 35 pages.
Mahmoud et al., Characterisation of aroma-active and off-odour compounds in German rainbow trout (*Oncorhynchus mykiss*). Part II: Case of fish meat and skin from earthen-ponds farming, Food Chemistry 2016, pp. 1-9.
Kaewsrithong et al., Unusual levels of phosphatidylcholine hydroperoxide in plasma, red blood cell, and livers of aromatic fish, original article, Fisheries Science 2000, 66: 768-775.
Kaewsrithong et al., Compositions of fatty acid hydroperoxide positional isomers in sweet smelt, yellowtail and rainbow trout livers phosphatidylcholine, Fisheries Science 2001, 67: 975-982.
Miller III et al., Volatile Compounds Produced in Sterile Fish Muscle (*Sebastes melanops*) by Pseudomonas perolens, Applied Microbiology, Feb. 1973, vol. 25, No. 2, p. 257-261.
Ahmed et al., Oxidation of Lipids in Foods, Sarhad Journal of Agriculture, Sep. 2016, vol. 32, Issue 3, p. 230-238.
Pahila et al., Establishment of sensory threshold levels of geosmin and 2-methylisoborneol for Filipinos, AACL Bioflux, International Journal of the Bioflux Society, 2014, vol. 7, Issue 2, pp. 94-102.
Ruan et al., Determination of off-flavor compounds, 2-methylisoborneol and geosmin, in salmon fillets using stir bar sorptive extraction-thermal desorption coupled with gas chromatography-mass spectrometry, Journal of Chromatography A, 1321 (2013) 133-136.
Robertson et al., Depuration rates and the sensory threshold concentration of geosmin responsible for earthy-musty taint in rainbow trout, *Onchrohynchus mykiss*, Aquaculture 245 (2005) 89-99.
Podduturi et al., Geosmin fluctuations and potential hotspots for elevated levels in recirculated aquaculture system (RAS): A case study from pikeperch (*Stizostedion lucioperca*) production in Denmark, Aquaculture 514 (2020) 734501, pp. 1-8.
Burr et al., Impact of depuration of earthy-musty off-flavors on fillet quality of Atlantic salmon, *Salmo salar*, cultured in a recirculating aquaculture system, Aquacultural Engineering 50 (2012) 28-36.
Davidson et al., Evaluation of depuration procedures to mitigate the off-flavor compounds geosmin and 2-methylisoborneol from Atlantic salmon *Salmo salar* raised to market-size in recirculating aquaculture systems, Aquacultural Engineering 61 (2014) 27-34.
Bristow et al., An extensive review of the extraction techniques and detection methods for the taste and odour compound geosmin (trans-1, 10-dimethyl-trans-9-decalol) in water, Trends in Analytical Chemistry 110 (2019) 233-248.
Hathurusingha et al., Experimental validation of a time-dependent model for chemicaltaste taint accumulation as geosmin (GSM) and 2-methylisoborneol(MIB) in commercial RAS farmed barramundi (*Lates calcarifer*), Ecological Modelling 340 (2016) 17-27.
Lindholm-Lehto et al., Depuration of geosmin- and 2-methylisoborneol-induced off-flavors in recirculating aquaculture system (RAS) farmed European whitefish *Coregonus lavaretus*, J Food Sci Technol (Oct. 2019) 56(10): 4585-4594.
Houle et al., Geosmin causes off-flavour in artic charr in recirculating aquaculture systems, Aquaculture Research, 2011, 42, 360-365.
Summerfelt et al., Fish Farming in Land-Based Closed Containment Systems, World Aquaculture, Mar. 2014, pp. 18-22.
Poole et al., Prevention of muddy taints in farmed Barramundi, Project No. 2009/775, Feb. 2015, 166 pages.
Azaria et al., Off-Flavor compounds in recirculating aquaculture systems (RAS): Production and removal processes, Aquacultural Engineering 83 (2018) pp. 57-64.
Murray et al., Review of Recirculation Aquaculture System Technologies and their Commercial Application, Prepare for Highlands and Islands Enterprise, Stirling Aquaculture, Mar. 2014, 82 pages.
Lindholm-Lehto et al., Controlling of geosmin and 2-methylisoborneol induced off-flavours in recirculating aquaculture system farmed fish—A review, Accepted Oct. 5, 2018, Aquaculture Research, 50, 9-28.
Tucker, Off-Flavor Problems in Aquaculture, Reviews in Fisheries Science, 2000, 8:1, 45-88.
Tucker et al., Off-flavors in pond-grown ictalurid catfish: Causes and management options, J World Aquaculture Society, 2020; 51, pp. 7-92.
Fossmark et al., Effects of reduced organic matter loading through membrane filtration on the microbial community dynamics in recirculating aquaculture systems (RAS) with Atlantic salmon parr (*Salmo salar*), Journal Pre-Proof, Aquaculture, 2019, Accepted Mar. 18, 2020, 53 pages.
Pestana et al., A continuous flow packed bed photocatalytic reactor for the destruction of 2-methylisoborneol and geosmin utilising pelletised TiO2o, Chemical Engineering Journal 235, 2014, 293-298.
Schrader et al., Novel Derivatives of 9, 10-Anthraquinone are Sectrive Algicides against the Musty-Odor Cyanobacterium Oscillatoria perornata, Applied and Environmental Microbiology, Sep. 2003, vol. 69, No. 9, p. 5319-5327.
Nam-Koong et la., Removal of the off-flavor compounds geosmin and 2-methylisoborneol from recirculating aquaculture system water by ultrasocially induced cavitation, Aquacultural Engineering 70 , 2016, pp. 73-80.
Phalia et al., Reduction of off-flavour compounds (geosmin and 2-methylisoborneol) using different organic acids, AACL Bioflux, International Journal of the Bioflux Society, 2013, vol. 6, Issue 6, pp. 511-517.
Sarker et al., Reducing geosmin off-flavor compounds and waste outputs through dietary phosphorus managemetn in rainbow trout aquaculutre, Aquaculture Environment Interactions, vol. 6, 105-117, 2014.
Schrader et al., Evaluation of ozonation on levels of the off-flavor compounds geosmin and 2-methylisoborneol in water and rainbow trout *Oncorhynchus mykiss* from recirculating aquaculture systems, Aquacultural Engineering 43, 2010, 46-50.
International Search Report in corresponding International Application No. PCT/US2021/027855, dated Jul. 26, 2021, 2 pages.
Llyod et al., Analysis of 2-methylisoborneol and geosmin in catfish by microwave distillation—solid-phase microextraction, J Agric Food Chem., Jan. 1999; 47(1):164-9. doi: 10.1021/jf980419x.
Marx, C. J. et al., Development of Improved Versatile Broad-Host-range vectors for use in methylotrophs and other Gram-negative bacteria, Microbiology (2001) 147: pp. 2065-2075.
Chou, et al., Fast Growth Increases the Selective Advantage of a Mutation Arising Recurrently during Evolution under Metal Limitation, PLoS Genetics, Sep. 2009, vol. 5, Issue 9, e1000652, pp. 1-12.
Chubiz, et al., A novel pair of inducible expression vectors for use in Methylobacterium extorquens, BMC Research Notes, 2013, 6: 183, pp. 1-8.
Marx, C. J. et al., Broad-Host-Range cre-lox System for Antibiotic Marker Recycling in Gram-Negative Bacteria, BioTechniques, vol. 33, No. 5, Nov. 2002, pp. 1062-1067.
D'Argenio, D. A. et al. *Drosophila* as a Model Host for Pseudomonas aeruginosa Infection, Journal of Bacteriology (Feb. 2001) vol. 183: No. 4 pp. 1466-1471.
Marx, C. J. et al., Novel Methylotrophy Genes of Methylobacterium extorquens AM1 Identified by using Tansposon Mutagenesis Including a Putative Dihydromethanopterin Reductase, Journal of Bacteriology (Jan. 2003) 185, No. 2: 669-673.
Lee, et al., Asymmetric, Bimodal Trade-Offs During Adaptation of Methylobacterium to Distinct Growth Substrates, Evolution (Accepted May 21, 2009) 63-11: 2813-2830.
Marx, et al., Development of a Broad-Host-Range SacB-Based Vector for Unmarked Allelic Exchange, BMC Research Notes, Published Feb. 26, 2008, 1: 1, pp. 1-8.

(56) References Cited

OTHER PUBLICATIONS

Percival, S., et al. Determining Factors Affecting Muddy-Flavour Taint in Farmed Barramundi Lates Calcarifer, (2008) Aquaculture 284:136-143.
Jones, B., et al. Earthy-muddy tainting of cultured barramundi linked to geosmin in tropical northern Australia, (2013) Aquaculture Environment Interactions vol. 3:117-124.
Lindholm-Lehto Petra C. et al: "Controlling of geosmin and 2-methylisoborneol induced off-flavours in recirculating aquaculture system farmed fish—A review", Aquaculutre Reserch, [Online] vol. 50, No. 1, Oct. 30, 2018 (Oct. 30, 2018), pp. 9-28, XP055776337, GB. ISSN: 1355-557X, DOI: 10.1111/are.13881 Retrieved from the Internet: URL:https://onlinelibrary.wiley.com/doi/fu ll-XML/10.1111/are.13881> * 3.2.4 Biological methods *.
Rongfang Yuan et al: "Biodegradation of 2-methylisoborneol by bacteria enriched from biological activated carbon", Frontiers of Environmental Science & Engineering in China; Selected Publications From Chinese Universities, SP Higher Education Press, Heidelberg, vol. 6, No. 5, Jan. 4, 2012 (Jan. 4, 2012), pp. 701-710, XP035130098, ISSN: 1673-7520, DOI: 10.1007/S11783-011-0367-6.

* cited by examiner

MICROBIAL-BASED ANIMAL FEED FOR MODULATING OFF-FLAVOR CONTENT IN AQUACULTURE

CROSS-REFERENCE TO RELATED APPLICATIONS

This application is a 371 National Stage Entry of International Application No. PCT/US2021/027855, filed Apr. 18, 2021, which claims the benefit of U.S. Provisional Application No. 63/012,868, filed on Apr. 20, 2020, and 63/104,480, filed on Oct. 22, 2020, both of which are incorporated by reference herein in their entireties.

FIELD OF THE INVENTION

The invention relates to methods and compositions for reduction of off-flavor, in particular addition of microbial biomass to aqueous environments and aquaculture systems.

BACKGROUND

While a major world consumer of seafood by volume, the United States' domestic seafood production is limited. As a result, 90% of the seafood consumed in the US is imported, and the seafood trade deficit has grown to $14 billion in 2016—second only to oil. Aquaculture will play a major role in meeting the ever-growing demand for seafood while increasing national self-sufficiency. Aquaculture is rapidly expanding to meet the growing need for sustainable protein sources. Recently, several large commercial aquaculture farms have started their operations as recirculated aquaculture systems (RAS). These enterprises are being closely watched by the seafood community as they could play a key role in meeting the domestic need for high quality fish. However, RAS facilities face many challenges, chief among them off-flavor mitigation and sourcing high quality fish feed.

These off-flavors are primarily caused by two molecules—geosmin (GSM) and 2-methylisoborneol (2-MIB), which are known to accumulate in fish grown in RAS—and pond-based aquaculture operations. These compounds are produced by microorganisms such as cyanobacteria or actinomycetes and vary depending on water quality and season. To mitigate these off-flavors, production facilities expend valuable resources to purge the fish of this "muddy" flavor. This purging, also known as depuration, involves cycling the RAS with clean water and holding the fish until off-flavors are reduced below an acceptable threshold. While generally effective, there are drawbacks including weight loss (up to 5%) and an extended production cycle prior to the product reaching market. Improved methods for mitigating production of off-flavor compounds and modulating the taste perception of aquatic species grown in aquaculture systems are needed.

BRIEF SUMMARY OF THE INVENTION

Methods for modulating the off-flavor taste found in either aquatic species grown in an aquaculture system or for aqueous environments including municipal water supplies are provided herein.

In one aspect, methods are provided for decreasing off-flavor in an aquatic species for human or animal consumption. The methods include providing biomass derived from a microorganism to an aquatic species in an aquaculture production system. Off-flavor is reduced in the tissues, e.g., edible tissues, of the aquatic species, in comparison to the aquatic species grown under identical conditions in the absence of the biomass. In some embodiments, the biomass does not mask off-flavor (e.g., mask the flavor of one or more off-flavor compound) present in tissues of the aquatic species or alter the natural flavor of the aquatic species.

In some embodiments, the biomass is provided in the form of a feed ingredient (e.g., as a component of a feed composition) that is consumed by the aquatic species. In some embodiments, the biomass is provided as part of a finishing feed, which is provided after feeding the aquatic species one or more different feed, such as a starter feed and/or a growout feed, to reduce off-flavor prior to harvesting the aquatic species. In other embodiments, the biomass is the only feed consumed by the aquatic species throughout its growth cycle.

In some embodiments, the aquaculture production system is a recirculating aquaculture system (RAS), a partial RAS system (e.g., a RAS system with a lower degree of recirculation, such as a system in which a portion of the water is recirculated), a pond, a cage, or a flow through system.

In some embodiments, the amount of one or more off-flavor producing compounds is modulated in the aquatic species. For example, the amount of one or more off-flavor producing compounds may be decreased or increased by at least about 10 parts per trillion (ppt), in comparison to the aquatic species grown under identical conditions in the absence of the feed containing the biomass. The one or more off-flavor compounds may include 2-methylisoborneol (2-MIB) and/or trans-1,10-dimethyl-trans-9-decalol (geosmin; GSM). In one embodiment, 2-MIB in the aquatic species, e.g., in edible tissues, of the aquatic species, is decreased by at least about 10 ppt, in comparison to the aquatic species grown under identical conditions in the absence of the feed containing the biomass. In some embodiments, GSM in the aquatic species, e.g., in edible tissues, of the aquatic species, is reduced by at least about 10 ppt, in comparison to the aquatic species grown under identical conditions in the absence of the feed containing the biomass.

In some embodiments, the method does not include or depend on depuration or purging to reduce off-flavor. In other embodiments, the aquatic species is subsequently depurated or purged to further reduce off-flavor after providing biomass to the aquaculture system.

In some embodiments of the method, the weight of the aquatic species is higher than when the aquatic species is grown under identical conditions in the absence of the biomass and is depurated or purged, or depurated or purged for a longer period of time, to reduce off-flavor. In some embodiments, higher retained aquatic species mass is retained with a shorter depuration or purging time to reduce off-flavor than when the aquatic species is grown under identical conditions in the absence of the microbial biomass. In some embodiments, the amount of time needed for depuration or purging to reduce off-flavor to a particular desirable or acceptable level is shorter for an aquatic species grown according to a method as described herein in which microbial biomass is provided, in comparison to the aquatic species grown under identical conditions but in the absence of the microbial biomass. In some embodiments, the lipid content of the aquatic species is reduced, in comparison to the lipid content of the aquatic species grown under identical conditions in the absence of the biomass.

In some embodiments of the method, the rate of addition of the biomass to the aquatic production system is adjusted to minimize or avoid loss of weight or reduction of growth rate of the aquatic species, while optimizing the reduction of off-flavor.

In some embodiments, the microorganism from which the biomass is derived is a bacterial species. For example, the bacterial species may be a methylotrophic bacterium, such as a *Methylobacterium* species, such as, but not limited to, *Methylobacterium extorquens*. The microorganism may be from the genus *Methylobacterium, Methylomonas, Methylobacter, Methylococcus, Methylosinus, Methylocyctis, Methylomicrobium, Methylophilus, Methylobacillus, Hyphomicrobium, Xanthobacter, Bacillus, Paracoccus, Nocardia, Arthrobacter, Rhodopseudomonas, Pseudomonas, Candida, Hansenula, Pichia, Torulopsis, Rhodotorula, Escherichia*, or *Saccharomyces*. In some embodiments, the microorganism is a methylotrophic bacterium from the genus *Methylobacterium, Methylomonas, Methylobacter. Methylococcus, Methylosinus, Methylocyctis, Methylomicrobium, Methylophilus*, or *Methylobacillus*, or a methylotrophic bacterium from any of the genera described herein.

In some embodiments, the aquatic species is a vertebrate aquatic species, for example, a fish or reptile species. In some embodiments, the aquatic species is an invertebrate aquatic species, for example, a shrimp or mollusk species.

In some embodiments, the method provides modulated taste sensation, and the aquatic species, e.g., an edible tissue of the aquatic species, provides one or more improved taste test profile characteristic, as measured by a descriptive taste test panel, such as decreased off-flavor (e.g., "muddy" or "musty" flavor), in comparison to the aquatic species grown under identical conditions in the absence of the biomass.

In another aspect, methods are provided for decreasing off-flavor in an aquatic species for human or animal consumption. The methods include providing an ingredient to an aquatic environment and/or to an aquatic species in an aquaculture production system through an aquatic feed. The ingredient may originate from terrestrial, marine or alternative sources including but not limited to insects, algae or microbes, for example, in the form of refined or unrefined biomass. Off-flavor is reduced in the aquatic species, e.g., in an edible tissue of the aquatic species, in comparison to the aquatic species grown under identical conditions in the absence of the ingredient (e.g., biomass). In some embodiments, the ingredient (e.g., biomass) does not mask off-flavor or alter the natural flavor of the aquatic species.

In another aspect, an aquatic species, or one or more edible part or product thereof (for example, a fillet, eggs, etc.), is provided, wherein the aquatic species is produced by any of the methods described herein for decreasing off-flavor in an aquatic species for human or animal consumption. In some embodiments, the aquatic species, e.g., an edible tissue of the aquatic species, may provide one or more improved taste test profile characteristics, as measured by a descriptive taste test panel, in comparison to the aquatic species grown under identical conditions in the absence of the biomass. In some embodiments, the aquatic species e.g., an edible tissue of the aquatic species, includes a reduced level of 2-MIB and/or GSM, in comparison to the aquatic species grown under identical conditions in the absence of the biomass, e.g., in comparison to the same edible tissue of the aquatic species grown under identical conditions in the absence of the biomass.

In another aspect, methods are provided for treating water to modulate the level of one or more off-flavor compounds. The methods include providing biomass derived from a microorganism (e.g., single cell protein, an extract thereof, or one or more biomolecule derived from the biomass) to an aqueous environment. The level of one or more off-flavor producing compounds is increased or decreased in the water of the aqueous environment, in comparison to water in an identical aqueous environment in the absence of the biomass, extract, or biomolecule(s). In some embodiments of the method, the one or more off-flavor producing compound that is modulated includes 2-MIB and/or GSM.

In some embodiments, one or more biomolecules derived from a microorganism is provided to the aqueous environment, for example, one or more enzymes derived from microorganism or an enzyme preparation or formulation thereof.

In some embodiments, the biomass is derived from microbial species, such as a methylotrophic bacterium, for example, a *Methylobacterium* species, such as, but not limited to, Methylobacterium extorquens. The microorganism may be from the genus *Methylobacterium, Methylomonas, Methylobacter, Methylococcus, Methylosinus, Methylocyctis, Methylomicrobium, Methylophilus, Methylobacillus, Hyphomicrobium, Xanthobacter, Bacillus, Paracoccus, Nocardia, Arthrobacter, Rhodopseudomonas, Pseudomonas, Candida, Hansenula, Pichia, Torulopsis, Rhodotorula, Escherichia*, or *Saccharomyces*. In some embodiments, the microorganism is a methylotrophic bacterium from the genus *Methylobacterium, Methylomonas, Methylobacter, Methylococcus, Methylosinus, Methylocyctis, Methylomicrobium, Methylophilus*, or *Methylobacillus*, or a methylotrophic bacterium from any of the genera described herein.

In some embodiments, the aqueous environment may be an aquaculture production system, recycled water, wastewater treatment, or a municipal reservoir. The aqueous environment may be within an aquaculture production facility or may be a larger water treatment facility, such as a municipal water treatment facility.

In some embodiments, drinking water may be produced that includes the increased or decreased level of one or more off-flavor compound, for example, but not limited to, decreased level of 2-MIB and/or geosmin, in comparison to drinking water produced in an identical aqueous environment in the absence of the biomass, or extract or one or more biomolecule derived from the biomass or microorganism.

In some embodiments, the aqueous environment may be an aquaculture production system, such as a RAS, a partial RAS system, a pond, a cage, or a flow through system, that includes an aquatic species, and off-flavor is reduced in the aquatic species, for example, but not limited to, decreased level of 2-MIB and/or geosmin, in comparison to the aquatic species in an identical aqueous environment in the absence of the biomass. In some embodiments, the aquatic species, e.g., an edible tissue of the aquatic species, may provide one or more improved taste test profile characteristics, as measured by a descriptive taste test panel, in comparison to the aquatic species grown under identical conditions in the absence of the biomass, extract, or biomolecule(s).

DETAILED DESCRIPTION

Figure 1A:
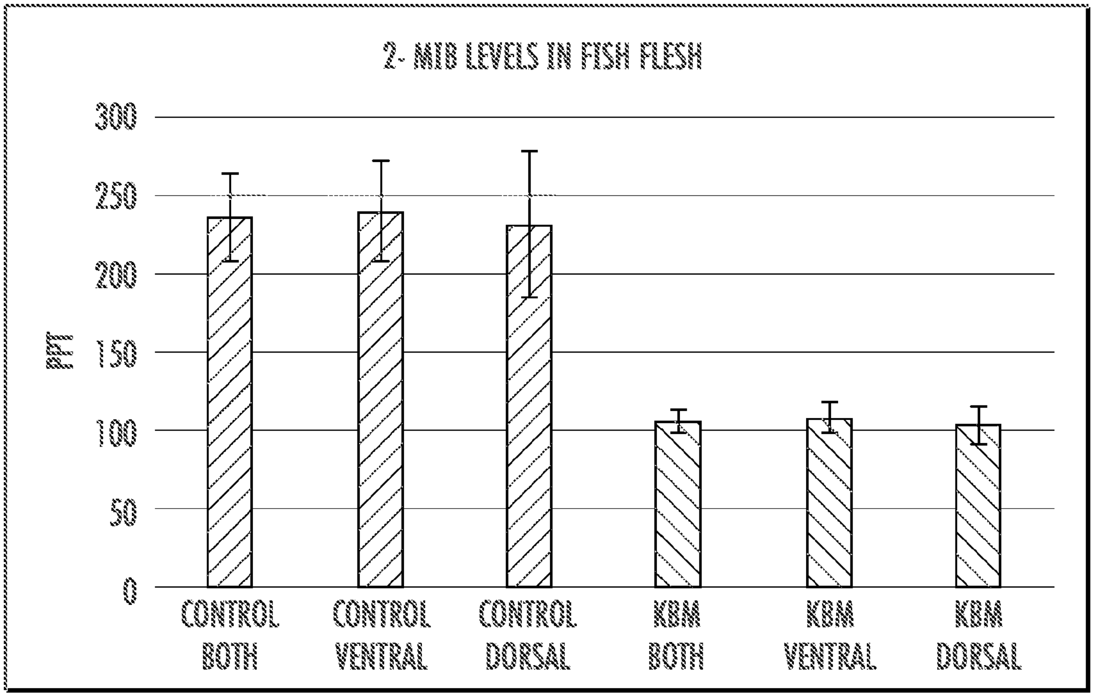
FIGS. 1A-1B show 2-MIB (1A) and GSM (1B) levels, in trout grown in a RAS system with and without biomass-containing feed (KBM).

Provided herein are methods and compositions for reducing or eliminating off-flavor, such as unpleasant or "muddy"

flavor of fish or seafood grown in aquaculture systems, or water in an aqueous environment. Microbial biomass, or an extract or biomolecule(s) therefrom, is provided to an aqueous environment, thereby decreasing or increasing the level of one or more off-flavor producing compounds, resulting in an improved taste sensation. In some embodiments, the biomass, or extract or biomolecule(s) derived therefrom, is provided in the form of a feed ingredient to fish or seafood grown in an aqueous environment, such as an aquaculture production system.

Definitions

Unless defined otherwise herein, all technical and scientific terms used herein have the same meaning as commonly understood by one of ordinary skill in the art to which this invention belongs. Singleton, et al., *Dictionary of Microbiology and Molecular Biology*, second ed., John Wiley and Sons, New York (1994), and Hale & Markham, *The Harper Collins Dictionary of Biology*, Harper Perennial, NY (1991) provide one of skill with a general dictionary of many of the terms used in this invention. Any methods and materials similar or equivalent to those described herein can be used in the practice or testing of the present invention.

The practice of the present invention will employ, unless otherwise indicated, conventional techniques of molecular biology (including recombinant techniques).

"A," "an" and "the" include plural references unless the context clearly dictates otherwise.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc."

An aquaculture feed is used in the production of an "aquaculture product," wherein the product is a harvestable aquacultured species (e.g., finfish, crustaceans), which is often sold for human consumption. For example, salmon are intensively produced in aquaculture and thus are aquaculture products. Aquaculture feeds may also be used for organisms such as zooplankton like krill, rotifers, and the like, that are food sources for larger aquaculture organisms such as carnivorous fish. In addition, aquaculture feeds described herein can be used as feed for ornamental fish, shrimp, hobbyist aquaculture, and the like, that are not intended as food for other organisms.

The term "aquaculture product" refers to food products intended for human consumption comprising any edible portion of an aquatic organism produced in an aquaculture operation as defined above. An aquaculture product may be, for example, a whole fish, a fillet cut from a fish, meat, skin, or fish eggs, each of which may be consumed as food. In some embodiments, such a product can be referred to as a fish or seafood product.

The term "biomass" refers to microbial cellular material. Biomass may be produced naturally, or may be produced from the fermentation of a native host or a recombinant production host. The biomass may be in the form of whole microorganism cells (termed single cell protein), whole cell lysates, homogenized cells, extracts, partially hydrolyzed cellular material, or partially purified cellular material. Biomass herein may also be in the form of one or more biomolecule(s) derived from microorganisms, such as, but not limited to, one or more enzyme(s) or an enzyme preparation.

The term "C1 carbon substrate" refers to any carbon-containing molecule that lacks a carbon-carbon bond. Examples are methane, methanol, formaldehyde, formic acid, formate, methylated amines (e.g., mono-, di-, and tri-methyl amine), methylated thiols, and carbon dioxide.

The term "C1 metabolizer" refers to a microorganism that has the ability to use a single carbon substrate as a sole source of energy and biomass. C1 metabolizers include methylotrophs and/or methanotrophs capable of growth on a single carbon substrate.

The term "C2 carbon substrate" refers to any carbon-containing molecule that contain two linked carbon molecules. Examples include ethanol, ethylamine, acetate, acetic acid, acetylaldehyde, ethylene glycol, and ethanethiol. Diethylamine and triethylamine can also be considered C2 carbon substrates.

The term "carotenoid" is understood in the art to refer to a structurally diverse class of pigments derived from isoprenoid pathway intermediates. The commitment step in carotenoid biosynthesis is the formation of phytoene from geranylgeranyl pyrophosphate. Carotenoids can be acyclic or cyclic, and may or may not contain oxygen, so that the term carotenoids include both carotenes and xanthophylls. In general, carotenoids are hydrocarbon compounds having a conjugated polyene carbon skeleton formally derived from the five-carbon compound IPP, including triterpenes ($C_{30}$ diapocarotenoids) and tetraterpenes ($C_{40}$ carotenoids) as well as their oxygenated derivatives and other compounds that are, for example, $C_{35}$, $C_{50}$, $C_{60}$, $C_{70}$, $C_{80}$ in length or other lengths. Many carotenoids have strong light absorbing properties and may range in length in excess of $C_{2}$oo-$C_{3}$o diapocarotenoids typically consist of six isoprenoid units joined in such a manner that the arrangement of isoprenoid units is reversed at the center of the molecule so that the two central methyl groups are in a 1,6-positional relationship and the remaining non-terminal methyl groups are in a 1,5-positional relationship. Such $C_{3}$o carotenoids may be formally derived from the acyclic $C_{3}$o$H_{42}$ structure, having a long central chain of conjugated double bonds, by: (i) hydrogenation (ii) dehydrogenation, (iii) cyclization, (iv) oxidation, (v) esterification/glycosylation, or any combination of these processes. $C_{40}$ carotenoids typically consist of eight isoprenoid units joined in such a manner that the arrangement of isoprenoid units is reversed at the center of the molecule so that the two central methyl groups are in a 1,6-positional relationship and the remaining non-terminal methyl groups are in a 1,5-positional relationship. Such $C_{40}$ carotenoids may be formally derived from the acyclic $C_{40}H_{56}$ structure, having a long central chain of conjugated double bonds, by (i) hydrogenation, (ii) dehydrogenation, (iii) cyclization, (iv) oxidation, (v) esterification/glycosylation, or any combination of these processes. The class of $C_{40}$ carotenoids also includes certain compounds that arise from rearrangements of the carbon skeleton, or by the (formal) removal of part of this structure. More than 600 different carotenoids have been identified in nature. Carotenoids include but are not limited to: antheraxanthin, adonirubin, adonixanthin, astaxanthin, canthaxanthin, capsorubrin, β-cryptoxanthin, a-carotene, β-carotene, β,ψ-carotene, δ-carotene, ε-carotene, echinenone, 3-hydroxyechinenone, 3'-hydroxyechinenone, γ-carotene, ψ-carotene, 4-keto-Y-carotene, ζ-carotene, a-cryptoxanthin, deoxyflexixanthin, diatoxanthin, 7,8-didehydroastaxanthin, didehydrolycopene, fucoxanthin, fucoxanthinol, isorenieratene, β-isorenieratene, lactucaxanthin, lutein, lycopene, myxobactone, neoxanthin, neurosporene, hydroxyneurosporene, peridinin, phytoene, rhodopin, rhodopin glucoside, 4-keto-rubixanthin, siphonaxanthin, spheroidene, spheroidenone, spirilloxanthin, torulene, 4-keto-torulene, 3-hydroxy-4-keto-torulene, uriolide, uriolide acetate, violaxanthin, zeaxanthin-β-diglucoside, zeaxanthin, and C30 carotenoids. Additionally, carotenoid compounds include derivatives of these molecules, which may include hydroxy-, methoxy-, oxo-, epoxy-, carboxy-, or aldehydic functional groups. Further, included carotenoid compounds include ester (e.g., glycoside ester, fatty acid ester) and sulfate derivatives (e.g., esterified xanthophylls).

The term "culturing" refers to growing a population of cells, e.g., microbial cells, under suitable conditions for growth, in a liquid or solid medium. Culturing can also refer to growing or farming aquatic species for consumption.

The term "derived from" encompasses the terms "originated from," "obtained from," "obtainable from," "isolated from," and "created from," and generally indicates that one specified material finds its origin in another specified material or has features that can be described with reference to another specified material.

"Edible products" or "edible parts" or "edible portions" includes any parts or portions of an aquatic species that are generally consumed by humans or other animals These include but are not limited to meat, fillet, eggs, organs, fins, bones, or skin.

As used herein, the term "expression" refers to the process by which a polypeptide is produced based on the nucleic acid sequence of a gene. The process includes both transcription and translation.

As used herein, "expression vector" refers to a DNA construct containing a DNA coding sequence (e.g., gene sequence) that is operably linked to one or more suitable control sequence(s) capable of effecting expression of the coding sequence in a host. Such control sequences include a promoter to affect transcription, an optional operator sequence to control such transcription, a sequence encoding suitable mRNA ribosome binding sites, and sequences which control termination of transcription and translation. The vector may be a plasmid, a phage particle, or simply a potential genomic insert. Once transformed into a suitable host, the vector may replicate and function independently of the host genome, or may, in some instances, integrate into the genome itself. The plasmid is the most commonly used form of expression vector. However, the invention is intended to include such other forms of expression vectors that serve equivalent functions and which are, or become, known in the art.

"Feed" or "feed composition" or "feed ingredient" are any item or ingredient that are mixed together for consumption by an animal. This includes but is not limited to animals, microorganisms, plants, or other protein sources, lipids, carbohydrates, binding agents, amino acids, vitamins, and minerals.

The term "feed mash" or "feed premix" refers to the crude mixture of aquaculture feed or animal/pet food ingredients prior to processing, optionally at high temperature, into an aquaculture feed or animal or pet food that is in the form of pellets or flakes.

A "gene" refers to a DNA segment that is involved in producing a polypeptide and includes regions preceding and following the coding regions as well as intervening sequences (introns) between individual coding segments (exons).

The term "Gram-negative bacteria" are bacteria that do not retain the crystal violet stain used in the Gram staining method of bacterial differentiation. They are characterized by their cell envelopes, which are composed of a thin peptidoglycan cell wall sandwiched between an inner cytoplasmic cell membrane and a bacterial outer membrane. In contrast, Gram-positive bacteria such as most bacteria in the phyla Actinobacteria or Firmicutes retain crystal violet due to their relatively thicker peptidoglycan cell wall layer. In general, Gram-positive bacteria are monoderms and have a single lipid bilayer whereas Gram-negative bacteria are diderms and have two lipid bilayers. As used here "Gram-negative bacteria" refers to all bacteria except those in the phyla Actinobacteria, Firmicutes, or Tenericutes. Examples of Gram-negative phyla include Proteobacteria, Aquificae, B acteroidetes, Chlamydiae, Chlorobi, Cyanobacteria, Deinococcus-Thermus, Fibrobacteres, Fusobacteria, Gemmatimonadetes, Nitrospirae, Planctomycetes, Spirochaetes, Synergistetes, and Verrucomicrobia.

The term "heterologous" or "exogenous," with reference to a polynucleotide or protein, refers to a polynucleotide or protein that does not naturally occur in a specified cell, e.g., a host cell. It is intended that the term encompass proteins that are encoded by naturally occurring genes, mutated genes, and/or synthetic genes. In contrast, the term "homologous," with reference to a polynucleotide or protein, refers to a polynucleotide or protein that occurs naturally in the cell.

The term "high growth methanotrophic bacterial strain" refers to a bacterium capable of growth using methane as its sole carbon and energy source.

As used herein, the term "host cell" or "parent cell," used interchangeably herein, refers to a cell or cell line into which a recombinant expression vector for production of a polypeptide may be transfected for expression of the polypeptide. Host cells include progeny of a single host cell, and the progeny may not necessarily be completely identical (in morphology or in total genomic DNA complement) to the original parent cell due to natural, accidental, or deliberate mutation. A host cell includes cells transfected or transformed in vivo with an expression vector.

The term "introduced," in the context of inserting a nucleic acid sequence into a cell, includes "transfection," "transformation," or "transduction" and refers to the incorporation of a nucleic acid sequence into a eukaryotic or prokaryotic cell wherein the nucleic acid sequence may be incorporated into the genome of the cell (e.g., chromosome, plasmid, plastid, or mitochondrial DNA), converted into an autonomous replicon, or transiently expressed.

The "isoprenoid pathway" is understood in the art to refer to a metabolic pathway that either produces or utilizes the five-carbon metabolite isopentyl pyrophosphate (IPP). As discussed herein, two different pathways can produce the common isoprenoid precursor IPP—the "mevalonate pathway" and the "non-mevalonate pathway." The term "isoprenoid pathway" is sufficiently general to encompass both of these types of pathway. Biosynthesis of isoprenoids from IPP occurs by polymerization of several five-carbon isoprene subunits. Isoprenoid metabolites derived from IPP vary greatly in chemical structure, including both cyclic and acyclic molecules. Isoprenoid metabolites include, but are not limited to, monoterpenes, sesquiterpenes, diterpenes, sterols, and polyprenols such as carotenoids.

The term "isoprenoid compound" refers to any compound which is derived via the pathway beginning with isopentenyl pyrophosphate (IPP) and formed by the head-to-tail condensation of isoprene units which may be of 5, 10, 15, 20, 30 or 40 carbons in length. There term "isoprenoid pigment" refers to a class of isoprenoid compounds which typically have strong light absorbing properties.

The term "methanotroph" means a prokaryote capable of utilizing methane as a substrate. Complete oxidation of methane to carbon dioxide occurs by aerobic degradation pathways. Examples of methanotrophs include, but are not limited to, the genera *Methylomonas, Methylobacter, Methylococcus*, and *Methylosinus.*

The term "methylotroph" means an organism capable of oxidizing organic compounds which do not contain carbon-carbon bonds. Where the methylotroph is able to oxidize $CH_4$, the methylotroph is also a methanotroph.

"Off-flavor" refers to an undesirable or unnatural flavor or odor in a food product or drinking water, such as an earthy, musty, or muddy taste or odor. An off-flavor can originate in raw materials, from chemical changes during food processing and storage, and/or from micro-organisms, and may be the result of the presence of one or more "off-flavor producing compound."

The term "operably linked" refers to a juxtaposition or arrangement of specified elements that allows them to perform in concert to bring about an effect. For example, a promoter is operably linked to a coding sequence if it controls the transcription of the coding sequence.

"Parts per trillion" or "ppt" is a measurement of the quantity of a substance in the air, water or soil. A concentration of one part per trillion means that there is one part of that substance for every one trillion parts of either air, water or soil in which it is contained.

As used herein, the term "polynucleotide" refers to a polymeric form of nucleotides of any length and any three-dimensional structure and single- or multi-stranded (e.g., single-stranded, double-stranded, triple-helical, etc.), which contain deoxyribonucleotides, ribonucleotides, and/or analogs or modified forms of deoxyribonucleotides or ribonucleotides, including modified nucleotides or bases or their analogs. Because the genetic code is degenerate, more than one codon may be used to encode a particular amino acid, and the present invention encompasses polynucleotides which encode a particular amino acid sequence. Any type of modified nucleotide or nucleotide analog may be used, so long as the polynucleotide retains the desired functionality under conditions of use, including modifications that increase nuclease resistance (e.g., deoxy, 2'—O—Me, phosphorothioates, etc.). Labels may also be incorporated for purposes of detection or capture, for example, radioactive or nonradioactive labels or anchors, e.g., biotin. The term polynucleotide also includes peptide nucleic acids (PNA). Polynucleotides may be naturally occurring or non-naturally occurring. The terms "polynucleotide," "nucleic acid," and "oligonucleotide" are used herein interchangeably. Polynucleotides may contain RNA, DNA, or both, and/or modified forms and/or analogs thereof. A sequence of nucleotides may be interrupted by non-nucleotide components. One or more phosphodiester linkages may be replaced by alternative linking groups. These alternative linking groups include, but are not limited to, embodiments wherein phosphate is replaced by P(O)S ("thioate"), P(S)S ("dithioate"), $(O)NR_2$ ("amidate"), P(O)R, P(O)OR', CO or $CH_2$ ("formacetal"), in which each R or R is independently H or substituted or unsubstituted alkyl (1-20 C.) optionally containing an ether (—O—) linkage, aryl, alkenyl, cycloalkyl, cycloalkenyl or araldyl. Not all linkages in a polynucleotide need be identical. Polynucleotides may be linear or circular or comprise a combination of linear and circular portions.

As used herein, "polypeptide" refers to a composition comprised of amino acids and recognized as a protein by those of skill in the art. The conventional one-letter or three-letter code for amino acid residues is used herein. The terms "polypeptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art.

A "promoter" refers to a regulatory sequence that is involved in binding RNA polymerase to initiate transcription of a gene. A promoter may be an inducible promoter or a constitutive promoter. An "inducible promoter" is a promoter that is active under environmental or developmental regulatory conditions.

The term "processed biomass" refers to biomass that has been subjected to additional processing such as drying, pasteurization, disruption, etc., each of which is discussed in greater detail below.

The term "recombinant," refers to genetic material (i.e., nucleic acids, the polypeptides they encode, and vectors and cells comprising such polynucleotides) that has been modified to alter its sequence or expression characteristics, such as by mutating the coding sequence to produce an altered polypeptide, fusing the coding sequence to that of another gene, placing a gene under the control of a different promoter, expressing a gene in a heterologous organism, expressing a gene at a decreased or elevated levels, expressing a gene conditionally or constitutively in manner different from its natural expression profile, and the like. Generally recombinant nucleic acids, polypeptides, and cells based thereon, have been manipulated by man such that they are not identical to related nucleic acids, polypeptides, and cells found in nature.

The terms "recovered," "isolated," "purified," and "separated" as used herein refer to a material (e.g., a protein, nucleic acid, or cell) that is removed from at least one component with which it is naturally associated. For example, these terms may refer to a material which is substantially or essentially free from components which normally accompany it as found in its native state, such as, for example, an intact biological system.

The term "selective marker" or "selectable marker" refers to a gene capable of expression in a host cell that allows for ease of selection of those hosts containing an introduced nucleic acid or vector. Examples of selectable markers include but are not limited to antimicrobial substances (e.g., hygromycin, bleomycin, or chloramphenicol) and/or genes that confer a metabolic advantage, such as a nutritional advantage, on the host cell.

A "signal sequence" refers to a sequence of amino acids bound to the N-terminal portion of a protein which facilitates the secretion of the mature form of the protein from the cell. The mature form of the extracellular protein lacks the signal sequence which is cleaved off during the secretion process.

"Taste panel" or "scientific taste panel" or "description taste panels" or "informal taste panel" are any group of persons having the joint duty to taste a product in order to determine factors relating to its flavor. These flavors can be described in many ways such as muddy, musty, earthy, grassy, fresh, or rancid. In some instances these flavors are ranked. In some instances the overall flavor or taste is combined allowing for one product to be scored as being preferable to another.

"Transfection" or "transformation" refers to the insertion of an exogenous polynucleotide into a host cell. The exogenous polynucleotide may be maintained as a non-integrated vector, for example, a plasmid, or alternatively, may be integrated into the host cell genome. The term "transfecting" or "transfection" is intended to encompass all conventional techniques for introducing nucleic acid into host cells. Examples of transfection techniques include, but are not limited to, calcium phosphate precipitation, DEAE-dextran-mediated transfection, lipofection, electroporation, and microinjection.

As used herein, the terms "transformed," "stably transformed," and "transgenic" refer to a cell that has a non-native (e.g., heterologous) nucleic acid sequence integrated into its genome or as an episomal plasmid that is maintained through multiple generations.

"Under transcriptional control" is a term well understood in the art that indicates that transcription of a polynucleotide sequence depends on its being operably linked to an element which contributes to the initiation of, or promotes transcription.

"Under translational control" is a term well understood in the art that indicates a regulatory process which occurs after mRNA has been formed.

As used herein, a "vector" refers to a polynucleotide sequence designed to introduce nucleic acids into one or more cell types. Vectors include cloning vectors, expression vectors, shuttle vectors, plasmids, phage particles, cassettes and the like.

As used herein, "wild-type," "native," and "naturally-occurring" proteins or microorganisms are those found in nature.

Methods for Reducing Off Flavor

Methods are provided for modulating, e.g., decreasing or eliminating, off-flavor, such as a "muddy" or unpleasant flavor, or increasing pleasant flavors in fish or seafood, in particular fish or seafood grown in an aqueous environment for aquaculture, such as an aquaculture production system. Microbial biomass is provided to an aqueous environment in which an aquatic species is grown. The biomass may be used as an ingredient which is included in a feed formulated for consumption by the aquatic species, or may be provided directly to the aqueous environment without formulation as a feed. The biomass may be, for example, in the form of single cell protein, a lysate, a hydrolysate, a homogenate, partially purified cellular material, an extract, or one or more biomolecule(s), such as, for example, one or more enzyme(s) or an enzyme preparation.

Off-flavor is modulated or reduced in the aquatic species, in comparison to an aquatic species grown under identical conditions in the absence of the biomass. Off-flavor may be evaluated as taste perception by a descriptive taste test panel or an individual taster, and one or more taste profile characteristics may be improved, as scored by the panel or determined by an individual. In some embodiments, off-flavor is reduced in comparison to the same aquatic species grown under identical conditions with a traditional feed that does not contain the biomass. In some embodiments, the biomass that is provided to the aqueous environment, e.g., aquaculture system, does not mask off-flavor in the aquatic species.

The aqueous environment may be any environment suitable for aquaculture, such as, but not limited to, a RAS, a partial RAS, a pond, a cage, or a flow through system, or any other environment in which aquatic species are produced for consumption.

One or more off-flavor compounds may be modulated, resulting in reduction or elimination of off-flavor perceived or measured, in an aquatic species grown in the aquatic environment. The modulation of the off-flavor compound(s) results in an improved taste perception of the flavor of the aquatic species. For example, one or more off-flavor compounds may be decreased or increased, for example, by at least about 10 parts per trillion (ppt), in comparison to the same aquatic species grown in an identical aquatic environment in the absence of the biomass. In some embodiments, the concentration of 2-MIB and/or GSM is reduced, for example, by at least about 10 ppt, in the aquatic species, in comparison to the same aquatic species grown in an identical environment in the absence of the biomass.

In some embodiments, the biomass is formulated into a feed, or provided as an addition to the aqueous environment. The biomass can be formulated into a finishing feed, where the aquatic species has been fed one or more different feed(s) prior to the introduction of the biomass (e.g., about the final 5-10% of growth time prior to harvesting of the aquatic species). The finishing feed is provided at the end of the growth cycle (e.g., about the final 5-10% of the growth cycle time frame) to reduce off-flavor and optionally to impart additional desired attributes to the aquatic species prior to harvesting. In other embodiments, the biomass may be formulated as a growout feed which is provided for the majority of the adult life of the aquatic species (e.g., about 85-90% of the growth cycle time frame). In other embodiments, the biomass can be fed prior to growout (e.g., a starter feed which is provided as an initial feed at the beginning of the life of the aquatic species (e.g., about the first 5% of growth cycle time frame). In some embodiments, the starter feed and/or growout feed may be a traditional feed such as a soy or fishmeal based feed.

In some embodiments, the method does not include and does not depend on a depuration or purging step to reduce off-flavor. In some embodiments, the method includes depuration or purging after providing the biomass to the aquatic species, to further reduce off-flavor, i.e., to reduce off-flavor to a greater degree than is achieved by the biomass alone.

In some embodiments, biomass is added to the aqueous environment, e.g., aquaculture production system, in the form of a feed ingredient or as an addition to the aqueous environment, at a rate that minimizes or avoids weight loss or reduced growth rate of the aquatic species, while optimizing or maximizing the reduction of off-flavor. Off-flavor may be reduced or eliminated in an aquatic species without significant loss of weight, in comparison to the same aquatic species that has been grown without addition of the biomass and then depurated or purged to reduce off-flavor.

In some embodiments of the method, lipid content of the aquatic species is reduced, in comparison to the same aquatic species grown in an identical aquatic environment in the absence of the biomass.

The aquatic species may be a vertebrate or invertebrate aquatic species. For example, vertebrate aquatic species may include fish, such as, but not limited to, salmon, barramundi, branzino, and trout. Vertebrate aquatic species may also include reptiles such as turtles and alligators. For example, invertebrate aquatic species may include, but are not limited to, crustacean (e.g., shrimps and crabs) and mollusks.

In some embodiments, consumption of the microbial biomass as described herein results in a microbiome shift within the aquatic species. For example, the microbiome shift may be within a microbial community that emits one or more off-flavor compound, such as, but not limited to, cyanobacteria or actinomycetes. In some embodiments, the microbiome shift includes reduction in the relative amount of one or more off-flavor compound emitting microbe within the microbiome of the aquatic species, such as, but not limited to, reduction of one or more cyanobacteria and/or actinomycetes species or strain, in comparison to an identical aquatic species that has not consumed the microbial biomass as described herein.

Methods are also provided for treating water to modulate, e.g., decrease or eliminate, off-flavor. Microbial biomass is provided to an aqueous environment, thereby modulating off-flavor. The biomass may be, for example, in the form of single cell protein, a lysate, a hydrolysate, a homogenate, partially purified cellular material, an extract, or one or more biomolecule(s), such as, for example, one or more enzyme(s) or an enzyme preparation. The level of one or more off-flavor producing compound is increased or decreased, in comparison to an identical aqueous environment in the absence of the microbial biomass. The aqueous environment may be, for example, an aquaculture production system, recycled water, waste water, or a municipal reservoir. The aqueous environment may be at the level of a large water treatment facility, such as a municipal water treatment facility, or at the level of a water treatment system within an aquaculture farm. In some embodiments, the aqueous environment is a municipal water treatment facility, wherein microbial biomass as described herein is added to reduce or eliminate one or more off-flavor producing compound, such as, for example, 2-MIB and/or GSM. In other embodiments, the aqueous environment is water within an aquaculture system such as a RAS, a partial RAS, a pond, a cage, or a flow through system, wherein microbial biomass as described herein is added to reduce or eliminate one or more off-flavor producing compound, such as, for example, 2-MIB and/or GSM.

One or more off-flavor compounds may be modulated in the aqueous environment, resulting in reduction or elimination of off-flavor in water in the environment. The modulation of the off-flavor compound(s) results in an improved taste perception of the flavor of the water or in the edible tissues of an aquatic species grown in the aqueous environment. Off-flavor may be evaluated as taste perception by a descriptive taste test panel or an individual taster, and one or more taste profile characteristics may be improved, as scored by the panel or determined by an individual. For example, one or more off-flavor compounds may be decreased or increased, for example, by at least about 10 ppt, in comparison to the same aquatic species grown in an identical aquatic environment in the absence of the biomass. In some embodiments, the concentration of 2-MIB and/or GSM is reduced, for example, by at least about 10 ppt, in the aqueous environment or in an aquatic species grown in the environment, in comparison to in an identical aqueous environment in the absence of the biomass.

In some embodiments, drinking water may be produced from the aqueous environment in which off-flavor is reduced or eliminated, in comparison to drinking water produced from an identical aqueous environment to which the biomass has not been provided. For example, the drinking water may have a reduced level of 2-MIB and/or GSM, e.g., a reduction of at least about 10 ppt, in comparison to drinking water produced from an identical aqueous environment to which the biomass has not been provided.

Microbial Biomass

Biomass for use in the methods described herein is derived from one or more microorganism. Microorganisms or extracts or biomolecules thereof may be bacterial or fungal in origin. In some embodiments, the microorganism is a bacterial microorganism from the phylum Proteobacteria. In some embodiments, the microorganism is a bacterial microorganism from the class Alphaproteobacteria. In some embodiments, the microorganism is a Gram-negative bacterium.

Non-limiting examples of genera from which the non-naturally occurring microorganism may be derived include, but are not limited to, *Methylobacterium, Methylomonas, Methylobacter. Methylococcus, Methylosinus, Methylocyctis, Methylomicrobium, Methylophilus, Methylobacillus, Hyphomicrobium, Xanthobacter, Bacillus, Paracoccus, Nocardia, Arthrobacter, Rhodopseudomonas, Pseudomonas, Candida, Hansenula, Pichia, Torulopsis, Rhodotorula, Escherichia*, and *Saccharomyces*. Non-limiting examples of microbial species from which the non-naturally occurring microorganism may be derived include *Methylobacterium extorquens* (e.g., strains AM1, DM4, DSMZ1340, CM4, PA1, or BJ001 (formerly *Methylobacterium populi*)), *Methylobacterium radiotolerans, Methylobacterium nodulans, Methylobacterium aquaticum, Methylobacterium* spp. 4-46, and *Escherichia coli.*

In some embodiments, the microorganism is a methylotrophic bacterium.

Numerous transformation protocols and constructs for introducing and expressing exogenous polynucleotides in host cells are known in the art. In certain embodiments, a non-naturally occurring microorganism, e.g., a recombinant or a microorganism transformed with one or more heterologous nucleic acid, is used for production of biomass. Genetic modifications may take advantage of freely replicating plasmid vectors for cloning. These may include small IncP vectors developed for use in *Methylobacterium*. These vectors may include pCM62, pCM66, or pHC41 for cloning. (Marx, C. J. and M. E. Lidstrom *Microbiology* (2001) 147: 2065-2075; Chou, H.-H. et al. *PLoS Genetics* (2009) 5: e1000652)

In certain embodiments, genetic modifications will take advantage of freely replicating expression plasmids such as pCM80, pCM160, pHC90, or pHC91. (Marx, C. J. and M. E. Lidstrom *Microbiology* (2001) 147: 2065-2075; Chou, H.-H. et al. *PLoS Genetics* (2009) 5: e1000652)

In certain embodiments, genetic modifications will utilize freely replicating expression plasmids that have the ability to respond to levels of inducing molecules such as cumate or anhydrotetracycline. These include pHC115, pLC 290, pLC291. (Chou, H.-H. et al. *PLoS Genetics* (2009) 5: e1000652; Chubiz, L. M. et al. *BMC Research Notes* (2013) 6: 183)

In certain embodiments, genetic modifications will utilize recyclable antibiotic marker systems such as the cre-lox system. This may include use of the pCM157, pCM158, pCM184, pCM351 series of plasmids developed for use in *M. extorquens*. (Marx, C. J. and M. E. Lidstrom *BioTechniques* (2002) 33: 1062-1067)

In certain embodiments, genetic modifications will utilize recyclable antibiotic marker systems such as the cre-lox system. This may include use of the pCM157, pCM158, pCM184, pCM351 series of plasmids developed for use in *M. extorquens* (Marx, C. J. and M. E. Lidstrom *BioTechniques* (2002) 33: 1062-1067).

In certain embodiments, genetic modifications will utilize transposon mutagenesis. This may include mini-Tn5 delivery systems such as pCM639 (D'Argenio, D. A. et al. *Journal of Bacteriology* (2001) 183: 1466-1471) demonstrated in *M. extorquens*. (Marx, C. J. et al. *Journal of Bacteriology* (2003) 185: 669-673)

In certain embodiments, genetic modifications will utilize expression systems introduced directly into a chromosomal locus. This may include pCM168, pCM172, and pHC01 plasmids developed for *M. extorquens* AM1. (Marx, C. J. and M. E. Lidstrom *Microbiology* (2001) 147: 2065-2075; Lee, M.-C. et al. *Evolution* (2009) 63: 2813-2830)

In certain embodiments, genetic modifications will utilize a sacB-based system for unmarked exchange of alleles due to the sucrose sensitivity provided by sacB expression. This may include the pCM433 vector originally tested with *M. extorquens*. (Marx, C. J. et al. *BMC Research Notes* (2008) 1:1)

In some embodiments, the microorganism from which biomass is derived produces one or more carotenoid compound. In some embodiments, the microorganism is genetically modified or artificially pre-selected to produce elevated levels of one or more carotenoid compound(s) relative to the corresponding unmodified or unselected microorganism. The one or more carotenoid compound(s) may include, but are not limited to, β-carotene, lycopene, zeaxanthin, lutein, canthaxanthin, rhodopin, astaxanthin, sprilloxanthin, phoenicoxanthin, adonixanthan, 3-hydroxyechinenone, and/or echninenone. Non-limiting examples of microorganisms that produce elevated levels of one or more carotenoid compound(s) and methods for producing such microorganisms are provided in PCT Application Nos. WO2015/021352 A2 and WO2018/222946 A1, which are incorporated herein by reference in their entireties.

In some embodiments, the microorganism from which biomass is derived produces polyhydroxyalkanoate (PHA) (e.g., poly-β-hydroxybutyrate (PHB)). In some embodiments the microorganism may produce PHA and protein in a weight ratio of about 1:1000 to about 3:1, or about 1:1000 to about 1:6. In some embodiments, the PHA product produced by the microorganism is PHB. In some embodiments, the microorganism may have mutation(s) in one or more endogenous PHA biosynthesis gene(s), PHA degradation gene(s), and/or phasin gene(s), or external regulatory sequence(s) thereof (e.g., deletion or reduced expression of one or more PHA biosynthesis gene(s), or a mutation that results in reduced enzymatic activity of one or more PHA biosynthetic enzyme(s), or enhanced expression of one or more PHA degradation gene(s) or a mutation that results in enhanced enzymatic activity of one or more PHA degradation enzyme(s), or deletion or reduced expression of one or more phasin gene(s), or a mutation that results in reduced binding affinity of one or more phasin(s) for intracellular PHA granules), resulting in reduced production of PHA. In some embodiments, the microorganism may have one or more heterologous PHA degradation gene(s), resulting in reduced production of PHA or PHA with altered polymer molecular weight distribution or PHA with polymers that have reduced molecular weight on average or increased digestibility. Non-limiting examples of PHA producing microorganisms are provided in PCT Application No. WO2018/106549 A1, which is incorporated herein by reference in its entirety.

In some embodiments, methods for separating microbial biomass from a culture containing microbial cells may deploy centrifugation, condensation, or filtration.

In some embodiments, microbial biomass is incorporated into a feed product, such as a feed for one or more aquatic species. In certain embodiments, biomass that is incorporated into a feed or nutritional supplement can be in a dry, or substantially dry, form, e.g., containing less than about 20%, 10%, 5%, or 2% of moisture. In certain embodiments, the cultures are isolated by removing substantially all supernatant, such as by filtering, sedimentation, or centrifugation. In certain embodiments, the collection of cultures and further processing of biomass excludes a bacterial lysis step, e.g., by use of detergents or ultrasound. In certain embodiments, the processed microbial cells maintain substantially whole cell membranes (single cell protein). In some embodiments, a portion or a substantial portion (e.g., up to about 1%, 5%, 10%, 20%, 30%, 50%, or 80%, or more than about 1%, 5%, 10%, 20%, 30%, 50%, or 80%) of bacterial cells may maintain viability in the processed biomass. In other embodiments, the microbial biomass is in the form of a lysate, extract, or biomolecule(s) derived from microbial cells, such as, but not limited to, one or more enzyme or an enzyme preparation, and the biomass does not contain or substantially does not contain intact microorganism cells.

The feed may contain at least about 1% of the biomass by weight. In some embodiments, the feed contains up to about 10% biomass by weight, or any of about 1% to about 10%, about 1% to about 5%, about 2% to about 8%, about 5% to about 10% biomass by weight. In certain embodiments, the feed composition is optimized for consumption by the aquatic species, or other animals. For example, the feed may include one or more fatty acid (such as, but not limited to, omega-3 fatty acids, such as eicosapentaenoic acid (EPA) and/or docosahexaenoic acid (DHA), and/or one or more amino acid (such as, but not limited to, essential amino acids).

Methods for preparing a feed ingredient are also provided. In some embodiments, the method includes: (a) culturing in an appropriate medium at least one microorganism as described above; (b) concentrating the medium to provide a biomass; (c) optionally providing additional feed components; and (d) producing the feed ingredient from the biomass. In certain embodiments, step (b) includes centrifugation. In certain embodiments, step (b) includes allowing the biomass to settle. In certain embodiments, step (b) includes filtration. In certain embodiments, the method further includes a pre-treatment of the biomass after step (a) with a chemical agent (e.g., a surfactant or solvent) to disrupt the cell membranes of the biomass. In certain embodiments, the method further includes mechanical disruption of the cell membranes of the biomass after step (a).

The state of the biomass can be in whole cell, lysed or partially processed form, for example, including or in the form of at least one enzyme, such as at least one purified or partially purified enzyme derived from the biomass. Other caloric or nutritional supplements can also be incorporated into feed products. Feed is preferably palatable to the organism that is the intended recipient. This feed material may have any physical properties currently known for a food material (e.g., solid, liquid, soft). In some embodiments, feed produced as described herein will undergo a pelletization process, e.g., through a hot or cold extrusion process at an inclusion rate of less than about 1%, 5%, 10%, 20%, 25%, 30%, 40%, 50%, 60%, or 75%.

Methods of producing fish or seafood are also provided, including farming an aquatic species and providing a feed containing the biomass as described herein, to the aquatic species, or providing microbial biomass as described herein in an aqueous environment in which the aquatic species is grown.

Off-Flavor Producing Compounds

In the methods described herein, off-flavor is reduced or eliminated in an aquatic species and/or in an aqueous environment. Off-flavor is often produced by microbes such as cyanobacteria or actinomycetes. The disclosed methods mitigate or eliminate off-flavor by including biomass (e.g., single cell protein, or a lysate, extract, or biomolecule(s) derived therefrom) in an aqueous environment or in feed that is fed to an aquatic species. Off-flavor compounds can be increased or decreased to mitigate or eliminate off-flavor. In some embodiments, reduction or elimination of off-flavor is a consequence of a shift in the microbiome of the aquatic species, such as, for example, a shift in the level or prevalence of one or more cyanobacteria or actinomycetes species or strain in the microbiome of the aquatic species.

Non-limiting examples of off-flavor compounds include 2-methylisoborneol (2-MIB), geosmin (GSM), (E,E)-2,4-octadiene, (E,E)-1,3,5-octatriene, (E,E)-2,4-decadienal, (E,E)-2,4-heptadienal, (E,E)-2,4-octadienal, (E,E)-3,5-octadien-2-one, (E,Z)-2,4-decadienal, (E,Z)-2,4-heptadienal, (E,Z)-2,6-nonadienal, (E,Z)-3,5-octadien-2-one, (E,Z)-3,6-nonadien-1-ol, (E)-2-octenal, (E)-2-penten-1-ol, (Z)-4-heptenal, 1-heptanol, 1-octanol, 1-octen-3-ol, I-pentanol/1-octen-3-one, 1-penten-3-ol, 1,4,9-decatriene, 2-ethyl-1-hexanol, 2,3-butanedione, 2,3-octanedione, 2,3-pentanedione, benzaldehyde, dimethyl trisulfide, heptanal, hexanal, limonene, methional, n-octanal, nonanal, and styrene.

In some embodiments of the methods described herein, the concentration of 2-MIB and/or GSM is reduced in an aqueous environment or in an aquatic species grown in an aqueous environment.

The following examples are intended to illustrate, but not limit, the invention.

EXAMPLES

Example 1

Trout, barramundi, and shrimp grown in a RAS system were fed a feed product that contained microbial biomass from Methylobacterium extorquens ("KBM"). These aquatic species grown on KBM diet contained a notable decrease in off-flavor, when evaluated in a blind, randomized taste test.

RAS-grown barramundi, trout, and shrimp fed diets containing KBM appeared to have an improved taste profile in small blind taste testing panels, in comparison to the same species fed a control diet commonly accepted by those skilled in the art to be commercially relevant or practical diets, even without depuration. Specifically regarding barramundi, a 2×2 matrix of samples were prepared for tasting between KBM-feed and non-KBM feed, as well purged versus non-purged. Fillets were grilled with no seasoning and blindly evaluated by ~6 panelists. In each case, KBM fed fish performed similarly or better to purged fish with regards to taste and preference.

Figure 1B:
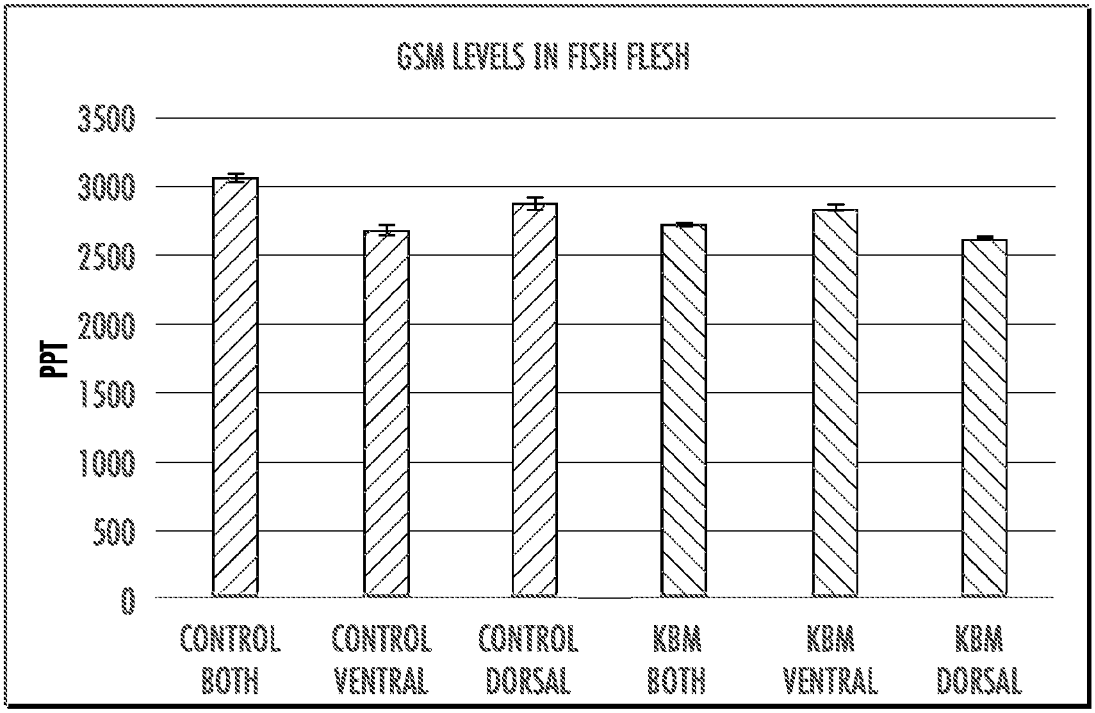
Figure 2:
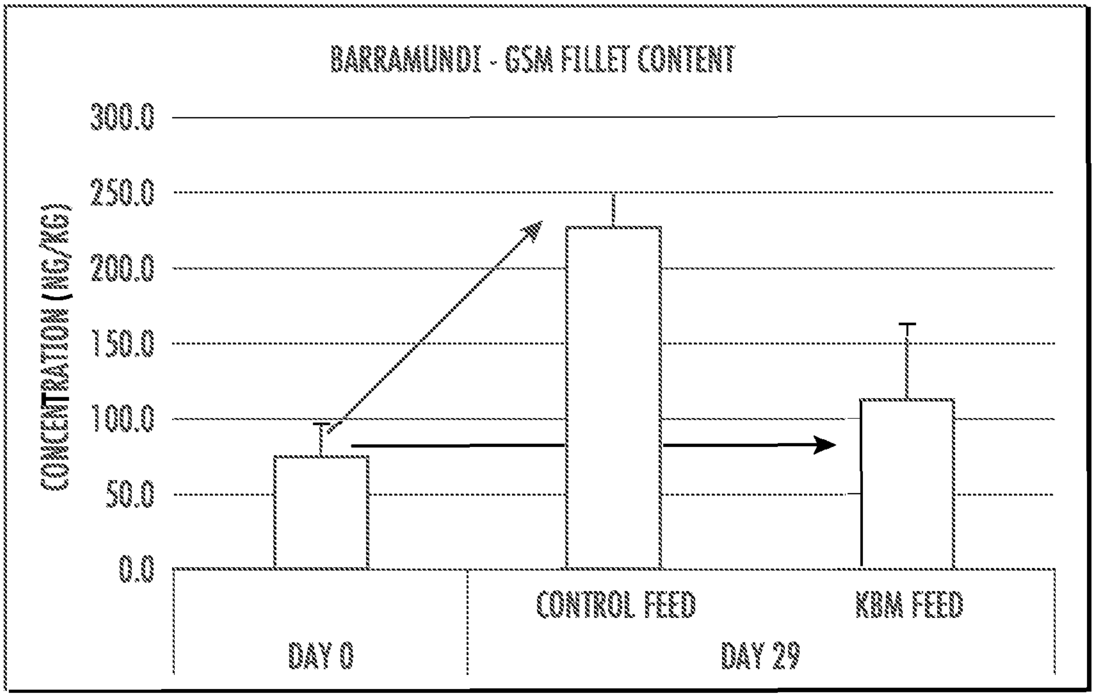
FIG. 2 shows GSM levels, in barramundi grown in a RAS system with and without biomass-containing feed (KBM).

Trout fillets from fish fed the KBM and control diets were analyzed for levels of 2-MIB and GSM utilizing a method similar to the method described at https://www.ncbi.nlm.nih.gov/pubmed/10563866. The 2-MIB and GSM results for trout are shown in FIGS. 1A and 1B, respectively. 2-MIB was significantly reduced in the trout fed KBM, while GSM was numerically reduced in trout fed KBM. Barramundi fillets were analyzed for levels of GSM. The results are shown in FIG. 2.

Example 2

Two populations of fish (100 per condition in each species) are separated from each other in a single RAS tank to assure similar exposure to GSM/2-MIB. One population receives a control diet based on fish and plant-proteins, while the other population receives a diet where a plant protein has been replaced isonitrogenously with KBM. Each population is fed its respective experimental diet and grown to harvest size (1 kg). At this point, 20 fish from each population are sampled immediately before, and at the end of, a 5-day depuration period. Water samples are also sampled at regular intervals during growth for GSM and 2-MIB measurements.

Fish are euthanized by ice immersion, weighed, fillets removed, and frozen at −20° C. All fish are randomly numbered at the time of harvest to allow for correlations between weight and flavor and to remove human bias.

Sensory Assessment of Fillets and Off Flavor Analytics

A double-blind study is performed to determine flavor profiles of the fish fillets, using methods described by Percival, S., et al. (2008) *Aquaculture* 284:136-143. and Jones, B., et al. (2013) *Aquaculture Environment Interactions* 3:117-124. Assessments are performed by both trained and non-trained sensory panels for each growth trial in each species to ensure robust results. Non-trained panelists are asked to score acceptability using hedonic scaling for likeability, while the trained panelists score samples for specific attributes such as appearance, flavor, or texture (Percival, supra). Attributes also include "muddiness," representing perception of GSM/2-MIB.

Analysis of 2-MIB and GSM Levels

Levels of 2-MIB and GSM in the fish fillets are analyzed as described in Example 1.

Fat Analysis

Fish are tested for fat content using fatty acid profiles with acid hydrolysis extraction.

Data Synthesis and Analysis

The two groups of fish (KBM +/−) are compared using statistical analysis of the data from the sensory panel, the GSM/2-MIB analytics, fat content, and weight, to determine the effect of KBM+ feed, and if a particular metric (e.g., fat content) is predictive of improved flavor.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. A method for decreasing off-flavor in an aquatic species for human or animal consumption, said method comprising:

providing biomass derived from a microorganism to an aquatic species in an aquaculture production system, wherein the microorganism is selected from the genus

*Methylobacterium*, *Methylomonas*, *Methylobacter*, *Methylococcus*, *Methylosinus*, *Methylomicrobium*, *Methylophilus*, or *Methylobacillus*, and wherein the biomass is provided in the form of a feed ingredient that is consumed by the aquatic species, wherein said providing of the biomass to the aquatic species results in reduction of off-flavor in edible tissues of the aquatic species, in comparison to the aquatic species grown under identical conditions in the absence of the biomass, as measured by decrease in an amount of one or more off-flavor producing compound in the edible tissues of the aquatic species.

2. The method of claim 1, wherein the biomass does not mask off-flavor or alter the natural flavor of the aquatic species.

3. The method according to claim 1, wherein the aquaculture production system comprises a recirculating aquaculture system (RAS), a partial RAS system, a pond, a cage, or a flow through system.

4. The method according to claim 1, wherein the amount of the one or more off-flavor producing compound is decreased in the edible tissues of the aquatic species by at least about 10 parts per trillion (ppt), in comparison to the aquatic species grown under identical conditions in the absence of the biomass.

5. The method of claim 4, wherein the one or more off-flavor producing compound comprises 2-methylisoborneol (2-MIB) and/or geosmin (GSM).

6. The method of claim 1, wherein the method does not comprise depuration or purging to reduce off-flavor.

7. The method of claim 1, wherein the aquatic species is subsequently depurated or purged to further reduce off-flavor.

8. The method of claim 1, wherein the weight of the aquatic species is higher than when the aquatic species is grown under identical conditions in the absence of the biomass and depurated or purged to reduce off-flavor for a period of time sufficient to reduce off-flavor to the same level as the aquatic species grown in the presence of the biomass.

9. The method of claim 1, wherein the rate of addition of the biomass to the aquatic production system is adjusted to minimize or avoid loss of weight or reduction of growth rate of the aquatic species, while optimizing the reduction of off-flavor.

10. The method of claim 1, wherein an edible portion of the aquatic species comprises one or more improved taste profile characteristics as measured by a descriptive taste test panel, in comparison to the aquatic species grown under identical conditions in the absence of the biomass.

* * * * *